United States Patent
Delaveaud

(10) Patent No.: US 10,635,866 B2
(45) Date of Patent: Apr. 28, 2020

(54) DEVICE USING AN ELECTRICALLY SMALL ANTENNA FOR OBTAINING AT LEAST ONE PIECE OF INFORMATION ON AN OBJECT PRESENT IN THE NEAR FIELD OF SAID ANTENNA

(71) Applicant: COMMISSARIAT A L'ENERGIE ATOMIQUE ET AUX ENERGIES ALTERNATIVES, Paris (FR)

(72) Inventor: Christophe Delaveaud, Saint-Jean de Moirans (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 0 days.

(21) Appl. No.: 16/068,202

(22) PCT Filed: Jan. 3, 2017

(86) PCT No.: PCT/EP2017/050090
§ 371 (c)(1),
(2) Date: Jul. 5, 2018

(87) PCT Pub. No.: WO2017/118636
PCT Pub. Date: Jul. 13, 2017

(65) Prior Publication Data
US 2019/0012499 A1  Jan. 10, 2019

(30) Foreign Application Priority Data
Jan. 4, 2016 (FR) ..................... 16 50003

(51) Int. Cl.
*G06K 19/06* (2006.01)
*G06K 7/10* (2006.01)
(Continued)

(52) U.S. Cl.
CPC ... *G06K 7/10297* (2013.01); *G06K 19/07773* (2013.01); *H04B 5/00* (2013.01); *H04B 5/0043* (2013.01)

(58) Field of Classification Search
USPC ........... 235/375, 385, 492; 340/572.1–572.9
See application file for complete search history.

(56) References Cited

U.S. PATENT DOCUMENTS 8,502,684 B2 * 8/2013 Bunza .................... A61B 5/202
                                                              340/572.1
8,543,071 B2   9/2013 El Kaamouchi et al.
(Continued)

FOREIGN PATENT DOCUMENTS

EP   2 509 222 A1   10/2012
EP   2 509 227 A1   10/2012

OTHER PUBLICATIONS

Huitema et al., "Impedance and Radiation Measurement Methodology for Ultra Miniature Antennas", IEEE Transactions on Antennas and Propagation, vol. 62, No. 7, Jul. 2014; pp. 3463-3473; in English; cited in the ISR.
(Continued)

*Primary Examiner* — Jamara A Franklin
(74) *Attorney, Agent, or Firm* — Seckel IP, PLLC

(57) ABSTRACT

A device (1) comprising an electrically small antenna (2), characterized in that it comprises a processing module (3) comprising a measuring element (4) connected to the antenna (2) for measuring at least one parameter of the antenna (2), said processing module (3) being configured for using said at least one measured parameter for obtaining at least one piece of information relating to an object (5) placed in a near field of the antenna (2).

20 Claims, 7 Drawing Sheets

Figure 1:
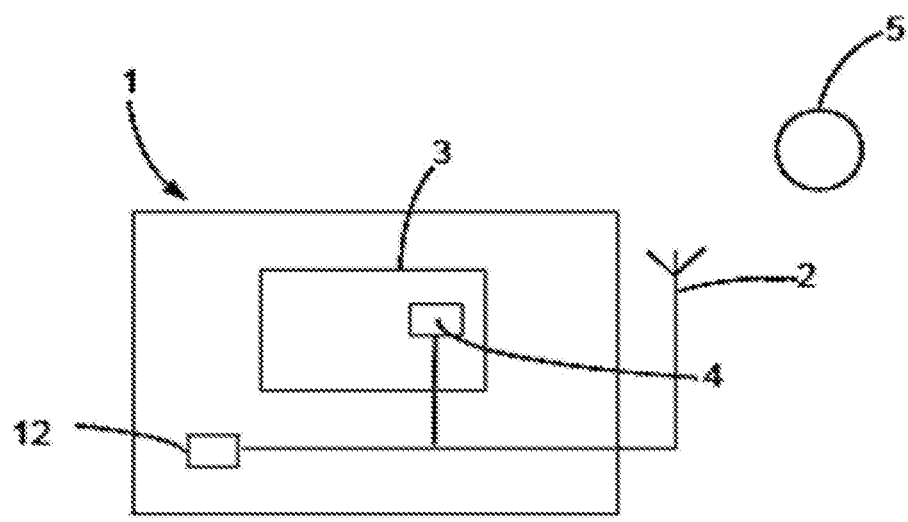

(51) Int. Cl.
*H04B 5/00* (2006.01)
*G06K 19/077* (2006.01)

(56) References Cited

U.S. PATENT DOCUMENTS

| | | |
|---|---|---|
| 8,902,014 B2 | 12/2014 | De Foucauld et al. |
| 2012/0256689 A1 | 10/2012 | El Kaamouchi et al. |
| 2012/0256698 A1 | 10/2012 | De Foucauld et al. |
| 2015/0233987 A1 | 8/2015 | Von Novak, III et al. |

OTHER PUBLICATIONS

Wheeler, "The Radiansphere Around a Small Antenna", Proceedings of the IRE, Aug. 1959, pp. 1325-1331; in English.
International Search Report and Written Opinion dated Mar. 23, 2017 issued in corresponding application No. PCT/EP2017/050090; w/ English partial translation and partial machine translation (18 pages).

* cited by examiner

DEVICE USING AN ELECTRICALLY SMALL ANTENNA FOR OBTAINING AT LEAST ONE PIECE OF INFORMATION ON AN OBJECT PRESENT IN THE NEAR FIELD OF SAID ANTENNA

TECHNICAL FIELD OF THE INVENTION

The invention relates to the field of sensors.

More particularly the subject matter of the invention is a device comprising an electrically small antenna.

PRIOR ART

The field of sensors is vast and encompasses a large number of technologies ranging from capacitive, inductive, magnetic sensors to ultrasonic and optical sensors, etc.

The combination of sensors with UHF ("Ultra High Frequency") antennas is a more recent, rapidly expanding field of research.

A first category of works seeks to combine a sensor with the radio frequency transmission function of the antenna. This involves combining a (moisture, gas concentration, motion, temperature, pressure, stress, radioactivity, current) sensor with digital conversion, processing and modulation electronics for transmitting/receiving information from the sensor via the antenna. The objective is therefore to transmit information wirelessly from the sensor thanks to a radio frequency transmission system. A simplified version of this approach may be RFID (Radio Frequency Identification) technology which offers the advantage of an asymmetrical radio frequency link with on one side a device that may be passive or of low consumption (sensor side).

A second category of works more directly combines a specific element performing the function of a sensor with the antenna so as to dispense with the digitizing electronics and the radio frequency transmitter. An illustration may be given with SAW (Surface Acoustic Wave) sensors connected to the antennas for performing various functions of remotely interrogatable passive (temperature, pressure, humidity) sensors.

There is therefore a need to provide new solutions for adding functionalities to products without complicating the manufacture of these products.

SUBJECT MATTER OF THE INVENTION

The object of the present invention is to provide a new product using an antenna to form a sensor.

According to the invention, the device comprises an electrically small antenna. The device comprises a processing module comprising a measuring element connected to the antenna for measuring at least one parameter of the antenna. The processing module is configured for using said at least one measured parameter for obtaining at least one piece of information relating to an object placed in a near field of the antenna.

The device may comprise a boundary between the near field of the antenna and the far field of the antenna. The boundary is delimited by a surface of a bounding sphere the radius of which is substantially equal to $\lambda/(2\pi)$ when the antenna is located at the center of said bounding sphere, where $\lambda$ corresponds to an operating wavelength of the antenna.

The antenna may be wholly included in a sizing sphere the radius of which is less than $\lambda/10$ when the antenna is located at the center of said sizing sphere, where $\lambda$ corresponds to the operating wavelength of the antenna.

The device may comprise a transmitting/receiving module connected to said antenna so as to allow transmitting and/or receiving data.

The device may comprise an operating mode in which at least some measurements performed by the measuring element do not inhibit the reception and/or the transmission of said data or no measurement performed by the measuring element inhibits the reception and/or the transmission of said data.

The device may comprise a directional coupler of the processing module coupled to the antenna implementing such an operating mode. Advantageously, the measuring element is connected to the antenna via this directional coupler in order to implement this operating mode.

The measuring element may be a measuring element of a parameter representative of the impedance of the antenna.

The antenna may have a no-load quality factor greater than 10.

The measuring element may be a scalar or vector detector connected to the antenna.

According to the invention, the method allows to determine at least one piece of information relating to an object with the aid of an electrically small antenna. The method comprises the following steps:
  placing said object in a near field of the antenna,
  measuring at least one parameter of the antenna,
  using said at least one measured parameter so as to obtain the at least one piece of information relating to said object placed in the near field of the antenna.

The step of using may comprise a step of comparing said at least one measured parameter, or a value determined from said at least one measured parameter, with processing data.

The step of measuring said at least one parameter may comprise a measurement of a value representative of the impedance of the antenna.

The step of using may comprise a step of determining of a real part and/or an imaginary part of the impedance of the antenna from said at least one measured parameter.

The device may comprise a step of extracting a datum relating to an impedance peak of the antenna and/or a step of extracting the quality factor associated with a real and/or imaginary part of the impedance of the antenna.

The datum relating to the extracted impedance peak and/or the extracted quality factor may be compared with processing data so as to determine said at least one piece of information relating to said object placed in the near field of the antenna.

The at least one piece of information relating to said object may be chosen from among at least one of the following pieces of information: the nature of the object, a dimension of the object, a position of the object in relation to the antenna.

The method may comprise a step of detecting said object in the near field of the antenna, said steps of measuring at least one parameter of the antenna, and using said at least one measured parameter being implemented only when the object is detected in the near field.

The invention further relates to a method of operating a device as previously defined. This method comprises an operating mode in which at least some measurements performed by the measuring element do not inhibit the reception and/or the transmission of said data or in which no measurement performed by the measuring element inhibits the reception and/or the transmission of said data.

SUMMARY DESCRIPTION OF THE DRAWINGS

Figure 2:
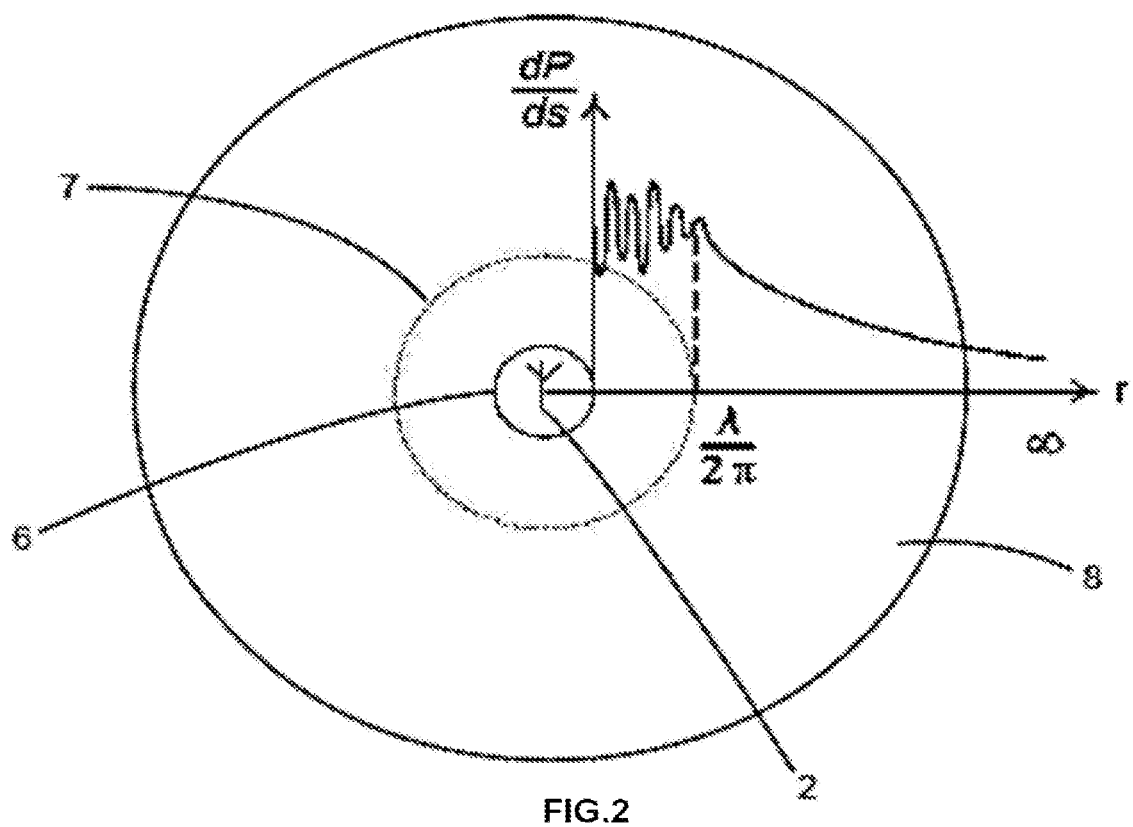
Figure 3:
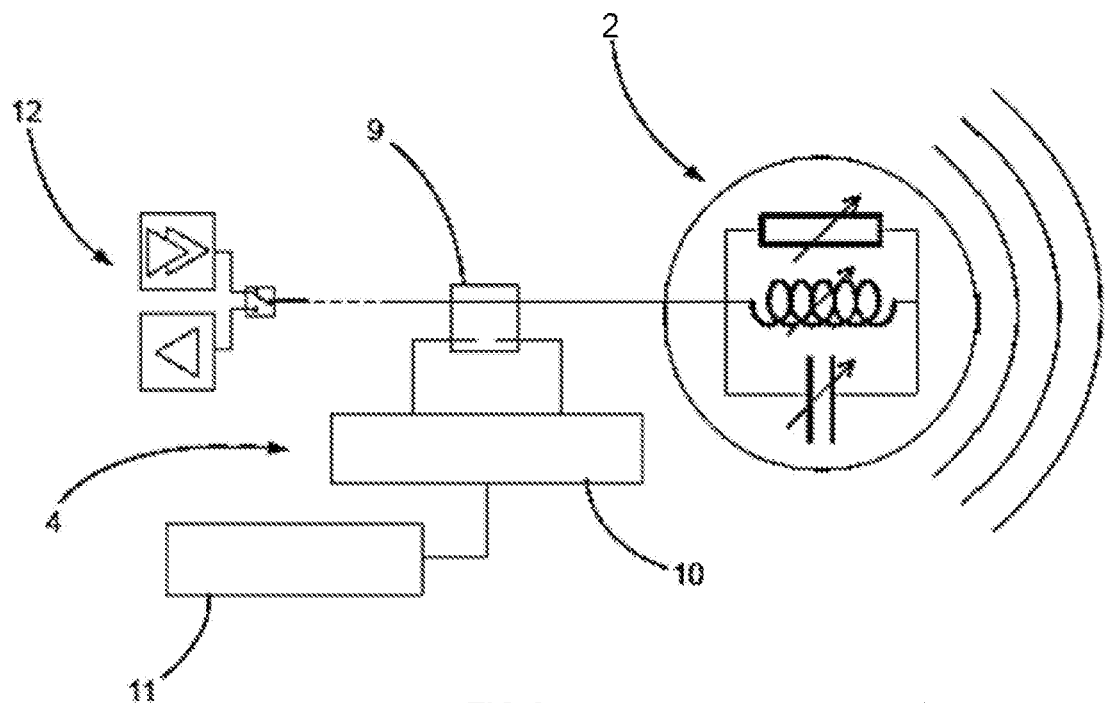
Figure 4:
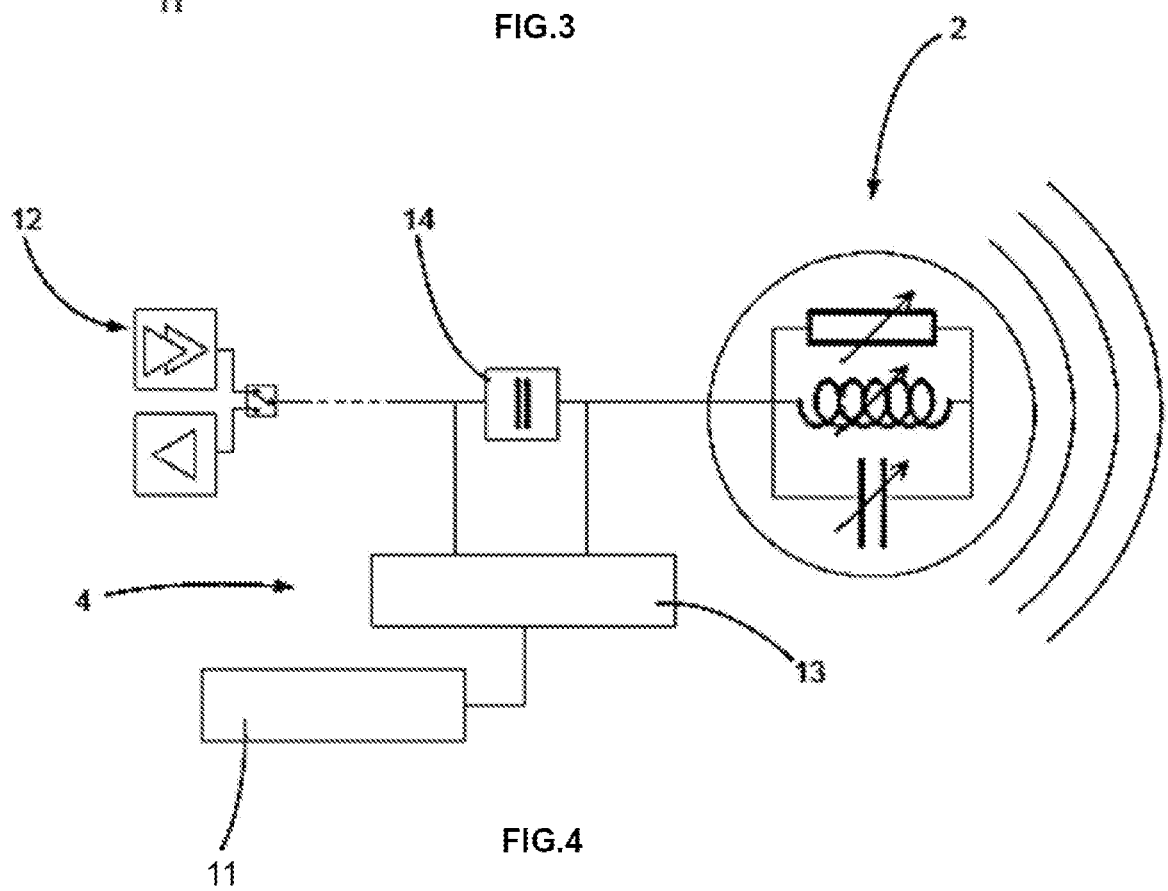
Figure 5:
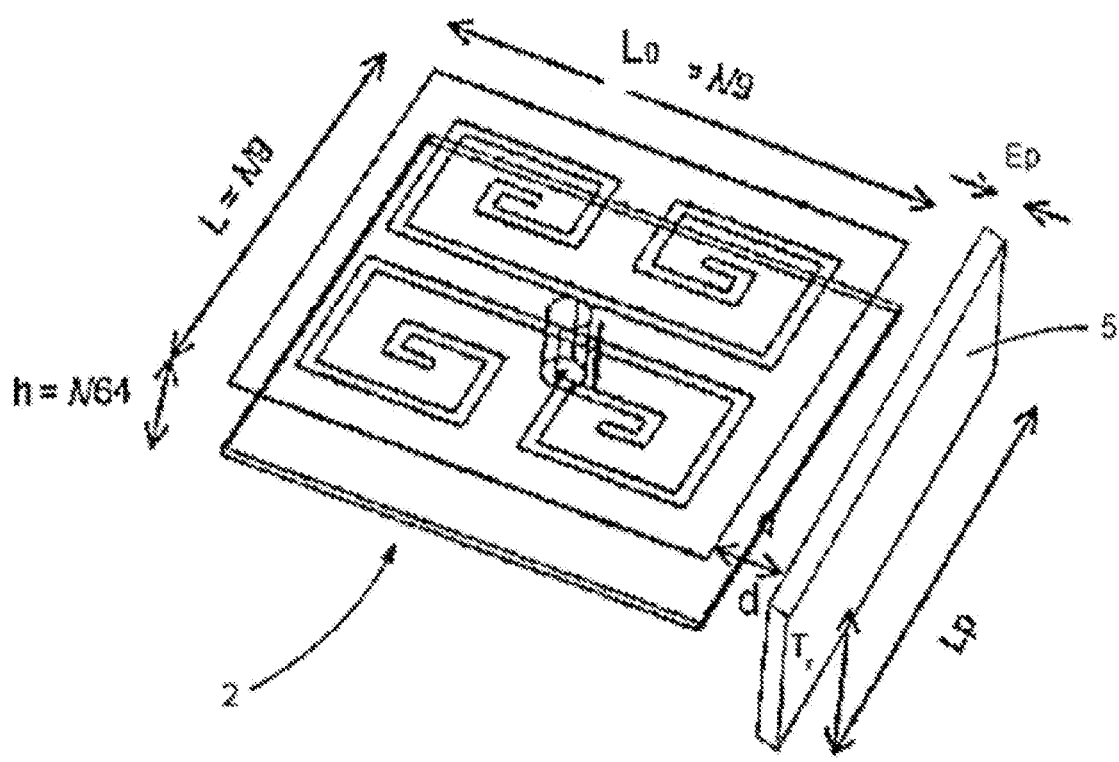
Figure 10:
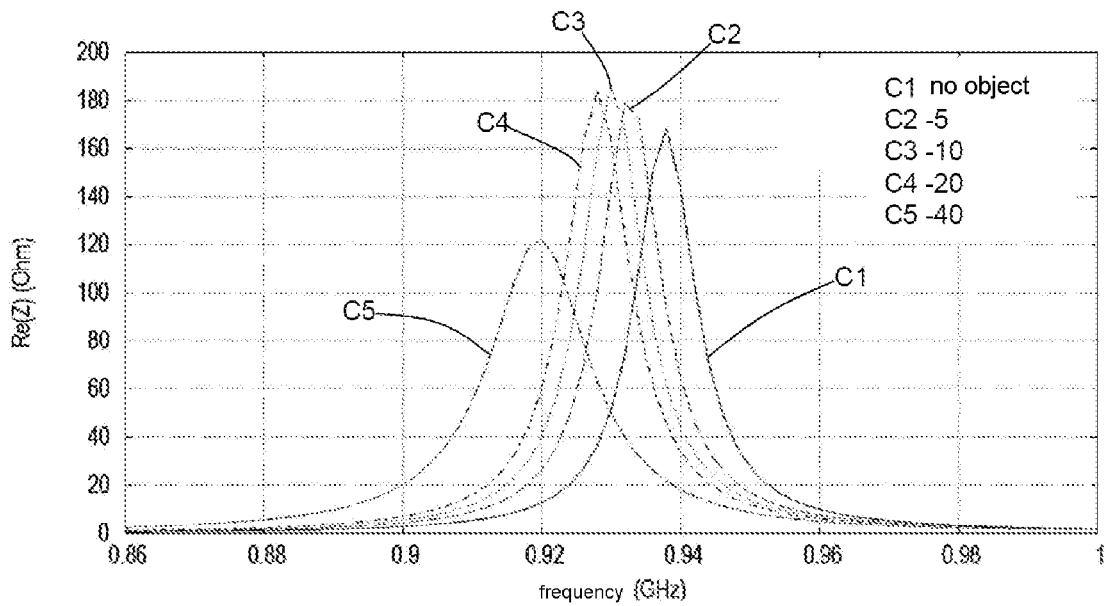
Figure 11:
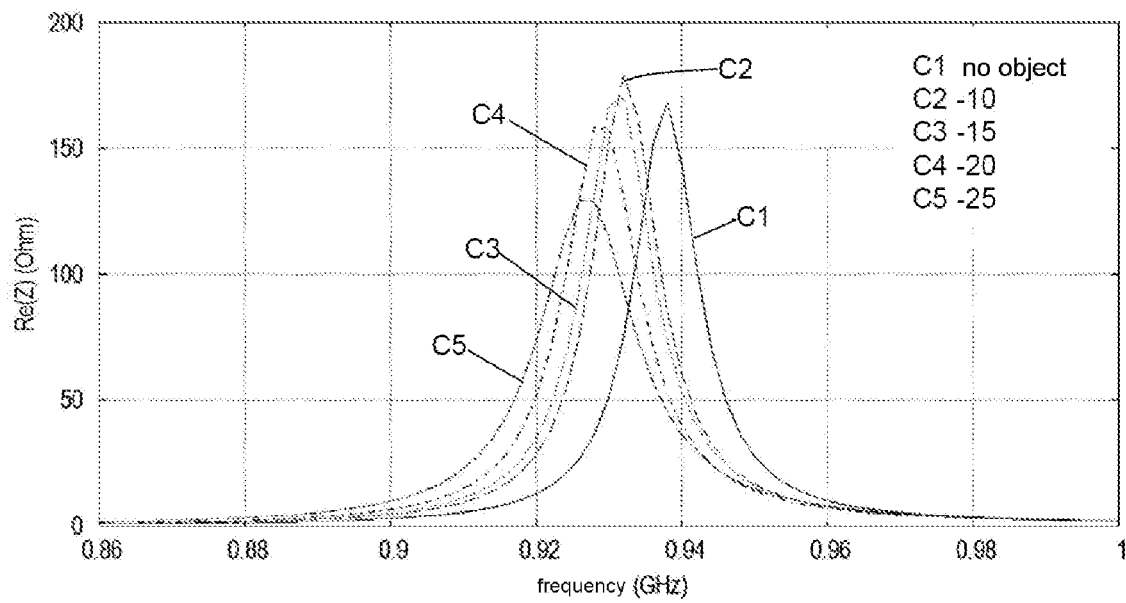
Figure 12:
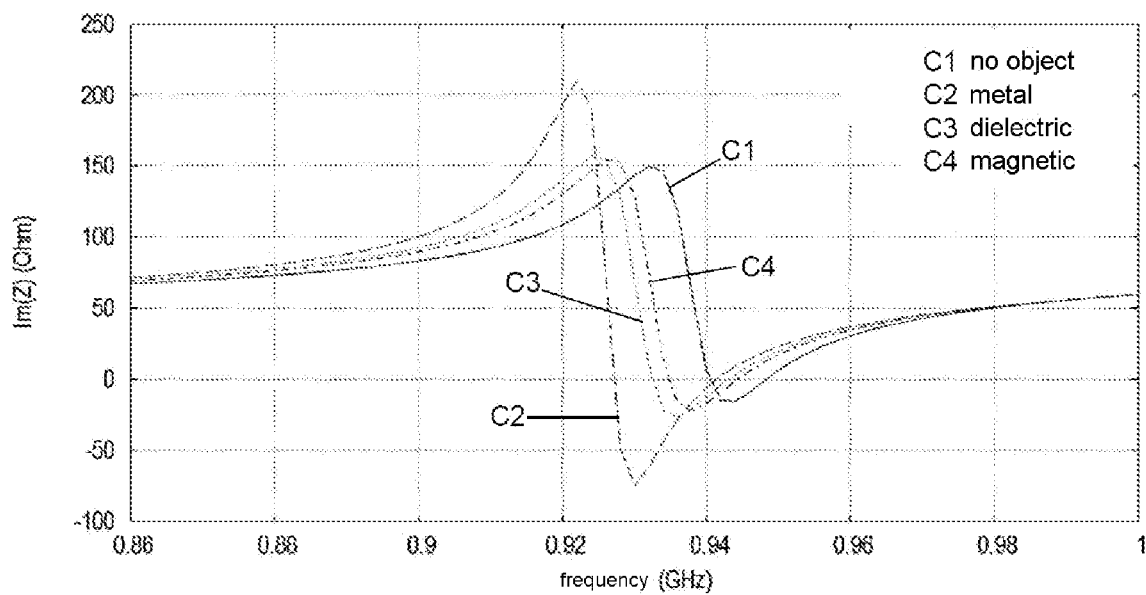
Figure 13:
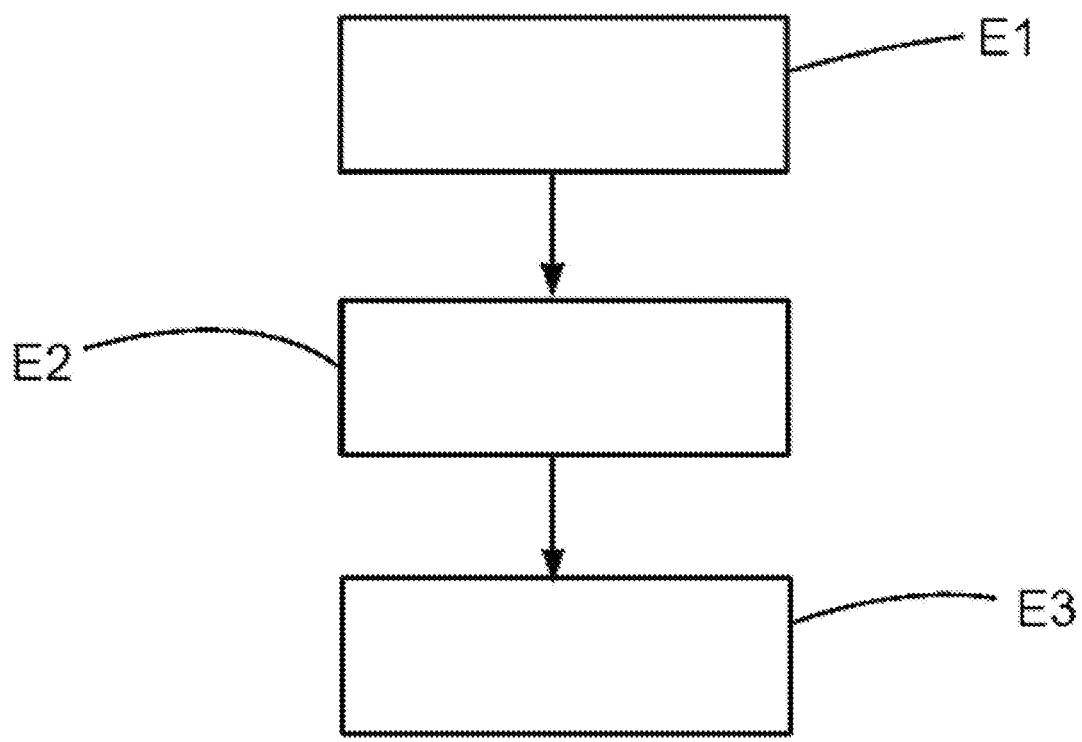

Other advantages and features will emerge more clearly from the following description of particular embodiments of the invention, given as non-restrictive examples and represented in the appended drawings in which:

FIG. 1 schematically illustrates a device according to an implementation of the invention cooperating with an object, FIG. 2 schematically illustrates the near field and far field areas associated with an antenna according to the implementation of the invention, FIGS. 3 and 4 illustrate two embodiments for forming a part of the device, FIG. 5 illustrates an embodiment of an antenna according to a particular implementation of the invention, FIGS. 6 to 11 illustrate evolution curves of the real part of the impedance of the antenna as a function of frequency for different configurations of the object, FIG. 12 illustrates evolution curves of the imaginary part of the impedance of the antenna as a function of frequency for different configurations of the object, FIG. 13 illustrates various steps for implementing the method according to a particular implementation of the invention.

DESCRIPTION OF PREFERRED EMBODIMENTS OF THE INVENTION

The device and the method provided and described below make it possible to use an electrically small antenna for forming a context sensor. "Context sensor" is understood to mean a sensor capable of determining from an electrically small antenna what is happening in the near field of said electrically small antenna. Accordingly, unlike the common uses of an electrically small antenna, it is provided here to use a sensitivity property of the electrically small antenna, usually regarded as a problem, for obtaining a piece of information on the near context of said antenna.

In the present description, an "electrically small antenna" has a well defined meaning known to the person skilled in the art. In particular, an electrically small antenna is defined as an antenna that is included in a volume smaller than the "radiant" sphere (known under the term "radiansphere") within the meaning of H. A. Wheeler. A more exhaustive definition may be extracted from the document "The Radiansphere Around a small antenna" by Harold A. Wheeler from "Proceedings of the IRE" of 1959, pages 1325 to 1331.

In the rest of the description, the intended antenna used as part of the device or the method is an electrically small antenna.

As illustrated in FIG. 1, the device 1 comprises an electrically small antenna 2, and a processing module 3 of an object 5 placed in the near field of the antenna 2, i.e. a data processing module of the object 5 placed in the near field of the antenna 2. In other words, the device 1 may, in an operating state, be combined with the object 5 then placed in the near field. The processing module 3 comprises a measuring element 4 connected to the antenna 2 for measuring at least one parameter of the antenna 2. The processing module 3 is configured for using said at least one measured parameter for obtaining at least one piece of information relating to said object 5 placed in the near field of the antenna 2.

The device 1 also comprises a transmitting and/or receiving module 12 connected to the antenna 2. The module 12 may be separated from the module 3 (as in FIG. 1) or alternatively form part of the same module.

In the field, the near field of the antenna 2 is also known under the designation of the reactive field of the antenna 2.

In the present description, the object 5 is taken in the broad sense according to a definition encompassing any type of object, any part of an object or any part of a human or animal body.

The measured parameter is different from information from a transmission or a reception using the antenna 2. In other words, the processing module 3 (and more particularly the measuring element 4) are distinct from the transmitting and/or receiving module 12 connected to the antenna 2. Accordingly, said at least one measured parameter makes it possible to determine a physical parameter of the antenna 2 capable of being interpreted for deducing therefrom said at least one piece of information relating to the object 5. Said at least one measured parameter is representative of a sensitivity property of the antenna 2, notably the impedance of the antenna 2 as will be described in more detail below.

Clearly the processing module 3 comprises software and/or hardware means for using said at least one measured parameter for deducing said at least one piece of information relating to the object 5.

Electrically small antennas offer limited performance resulting from a partially performed guided wave/radiated wave conversion in the restricted space that they occupy. The opening out of the electrical and magnetic fields in the vicinity of a compact radiating structure conventionally exhibits two distinct areas: a non-radiating reactive near field area and a far field area where the propagating field forms.

FIG. 2 precisely illustrates a volume 6 in which the antenna 2 is located. This volume 6 is included in a larger volume 7 delimiting the near field of the antenna 2, itself included in a volume 8 corresponding to the far field of the antenna 2. FIG. 2 further illustrates the evolution of the power density from the antenna 2 in a direction r away from the antenna 2 toward infinity.

In particular, the comparison between the volume 6 and the volume 7 makes it possible to define the electrically small antenna as previously mentioned.

In other words, the device may be such that it comprises a boundary between the near field of the antenna 2 and a far field of the antenna 2. This boundary is delimited by a surface of a bounding sphere 7 (FIG. 2) the radius of which is substantially equal to $\lambda/(2\pi)$ when the antenna 2 is located at the center of said bounding sphere 7, where $\lambda$ corresponds to the operating wavelength of the antenna 2. "Substantially equal" is understood to mean here that the radius of the bounding sphere is equal to $\lambda/(2\pi)$ by more or less applying a margin of error of 10% in the real case. In the theoretical case of an antenna 2, the radius of the bounding sphere 7 is considered equal to $\lambda/(2\pi)$ (then it is here termed a theoretical radius).

Moreover, according to the definition of the electrically small antenna, the antenna 2 is wholly included in the volume of a sizing sphere 6 the radius of which is less than $\lambda/10$, preferably less than $\lambda/(4\pi)$, when the antenna 2 is located at the center of said sizing sphere 6, where $\lambda$ corresponds to the operating wavelength of the antenna 2. In combination with the concept of the boundary between the near field and far field of the antenna, the sizing and bounding spheres have the same center which coincides with the center of the antenna 2.

In other words, an electrically small antenna may be considered small in relation to the operating wavelength of the antenna 2 which is a function of the operating frequency of the antenna 2. Accordingly, in general, one part of the antenna 2 may be connected to a component element of the antenna setting its operating frequency.

In having dimensions well below the non-radiating reactive field limit (λ/π), electrically small antennas are sensitive to their near context according to what may be placed in this particular near field area of the antenna 2. Disturbance of the reactive fields in the near field area of the antenna 2 is liable to modify the behavior of the antenna 2, change its properties and notably its input impedance. In the present description an input impedance or the impedance of the antenna represents the same thing. Documents EP2509222 and EP2509227 notably describe the problem of impedance disturbance of an antenna, and only provide a system for matching the impedance of the antenna to its environment in order to optimize its operation. The present invention provides a novel way to use these impedance disturbances for obtaining information regarding the object 5 disturbing the impedance of the antenna 2 when the object is placed in the near field of the antenna 2. In other words, the idea is then to use the modifications in the impedance of the antenna 2 for performing a function of detecting the proximity and/or the property/properties of the object 5 then termed the disturbing object. The characterization of the type of disturbance observed on the impedance of the antenna 2 may notably be used for determining the nature of the object (conductive, dielectric, magnetic materials), its size and its position (distance in relation to the antenna 2). Use may be made of these functionalities simultaneously with the transmission of electromagnetic waves between a guided and open medium (conventional role of the antenna).

Accordingly, the measuring element 4 is advantageously configured so as to measure a parameter representative of the impedance of the antenna 2. In the field of microwaves, this measured parameter is preferably a reflection coefficient (denoted parameter S).

In fact, the parameter representative of the impedance of the antenna 2 may be used to determine an impedance of the antenna 2 which is a complex number. From this complex number, it is possible to make use of the real part and/or the imaginary part which are interrelated values.

More generally, the modifications in the reactive field of the antenna 2 by the object 5 are likely to change both its radiation and its impedance. For determining the modifications in the reactive field of the antenna 2, a measuring element 4 of a scalar or vector type may be used directly connected to the antenna 2 via a directional coupler in order not to disturb the operation of the antenna 2 with its radio frequency transmitter if the latter also performs a function of transmitting and/or receiving data. Scalar detection provides information on the frequency and the amplitude of the reflection coefficient of the antenna 2. From this information, it is possible to characterize a piece of information relating to the object placed in the near field of the antenna. Vector measurement makes it possible to characterize the complex impedance of the antenna and provides more complete information about the changes. Preferably, only the information on changing the impedance is used here. The measurement of the disturbances of the impedance of the antenna 2 by the measuring element 4 makes it possible to obtain a piece of information on the near context of the antenna 2 notably on the object 5 present in the near field.

Thus, it is clear that the parameter representative of the impedance of the antenna 2 previously mentioned may be the impedance directly or a parameter allowing this impedance of the antenna 2 to be deduced.

According to one embodiment (FIG. 1), the device 1 comprises a transmitting/receiving module 12 connected to said antenna 2 for allowing the transmission and/or the reception of data by the antenna 2. Accordingly, the antenna 2 may be used in a processing mode of an object 5 and in a conventional data transmission and/or reception mode. These modes are not exclusive in the context where an object 5 may be processed by the processing module 3 concomitantly with transmitting and/or receiving data. In other words, the device may comprise an operating mode in which each measurement performed by the measuring element 4 does not inhibit (or does not disturb) the reception and/or the transmission of said data. This may notably be implemented through the use of a directional coupler of the processing module coupled to the antenna 2, of course it is only one example, other methods may be implemented (such as, for example, in FIG. 4 where the capacitor 14 performs this function). Thus, the invention further relates to a method of operating the device 1. This method therefore comprises an operating mode in which at least some measurements performed by the measuring element do not inhibit the reception and/or the transmission of said data or in which no measurement performed by the measuring element inhibits the reception and/or the transmission of said data.

As previously mentioned, the measuring element 4 may be a scalar or vector detector connected to the antenna 2.

FIG. 3 illustrates a schematic diagram of the antenna 2 coupled to a scalar detector. In particular, the measuring element 4 here comprises a coupler 9 coupled to the antenna 2 (notably to the input of the antenna 2), a power detector 10 connected to the coupler 9 and a monitoring module 11 for determining the value of said at least one measured parameter of the antenna 2. The reference 12 indicates a transmitting/receiving module connected to the antenna 2. The advantage here is that the coupler 9 allows a measurement without modifying the behavior of the antenna 2 which may then work concomitantly in data transmission and/or reception mode.

FIG. 4 illustrates a schematic diagram of the antenna 2 connected to a vector detector 13 of the impedance of the antenna 2 belonging to the measuring element 4. The vector detector 13 is connected in parallel to a component 14 mounted in series between the antenna 2 and the transmitting and/or receiving module 12. The component 14 is a correctly sized capacitor for inhibiting or limiting the disturbances of the transmissions/receptions of the module 12. Moreover, the measuring element 4 comprises a monitoring module 11 connected to the vector detector for determining the value of said at least one measured parameter of the antenna 2. The reference 12 indicates a transmitting/receiving module connected to the antenna 2.

Analysis of the disturbances preferably concerns only the impedance offered by the antenna 2 subjected to disturbances of its near operating context. The observed variations may concern the quality factor, the change of frequency, the real and imaginary part of the impedance. Depending on the type of antenna 2 (of the type generating an electrical field or of the type generating a magnetic field), different behaviors may be identified according to the nature of the disturbing objects. Thus, a characterization of the type of disturbing object 5 may be developed. For a given type of disturbing objects 5, the extent of the observed disturbance may provide information on the proximity of the object and/or the size of the object. The information gathered according to the scenarios and thanks to a calibration of the device may therefore provide qualitative or quantitative information.

The rest of the description provides a particular example of the use of the data relating to the impedance for processing the object 5, notably for characterizing it in order to learn more about it.

In this particular example, an antenna has been used of the type illustrated in FIG. 5 associated with an object 5 coming to disturb it. In FIG. 5, λ represents the operating wavelength of the antenna 2, h the height of the antenna 2, L the width of the antenna 2, Lo, the length of the antenna 2. The object 5 is parallelepiped in shape and has a thickness Ep, a transverse dimension Tr and a longitudinal dimension Lp. The reference d corresponds to a separation distance between the antenna 2 and the object 5.

Advantageously, the antenna 2 in FIG. 5 is parallelepiped in shape of width L and length Lo equal to 36 mm, and of height h 5 mm. It operates in the vicinity of 930 MHz, which gives it electrical dimensions of the order of $\lambda/9 \times \lambda/9 \times \lambda/64$. The radius of the sphere (sizing sphere) including the antenna 2 is then approximately $\lambda/12.6$. It is notably this antenna that will be used for preparing FIGS. 6 to 12.

Figure 6:
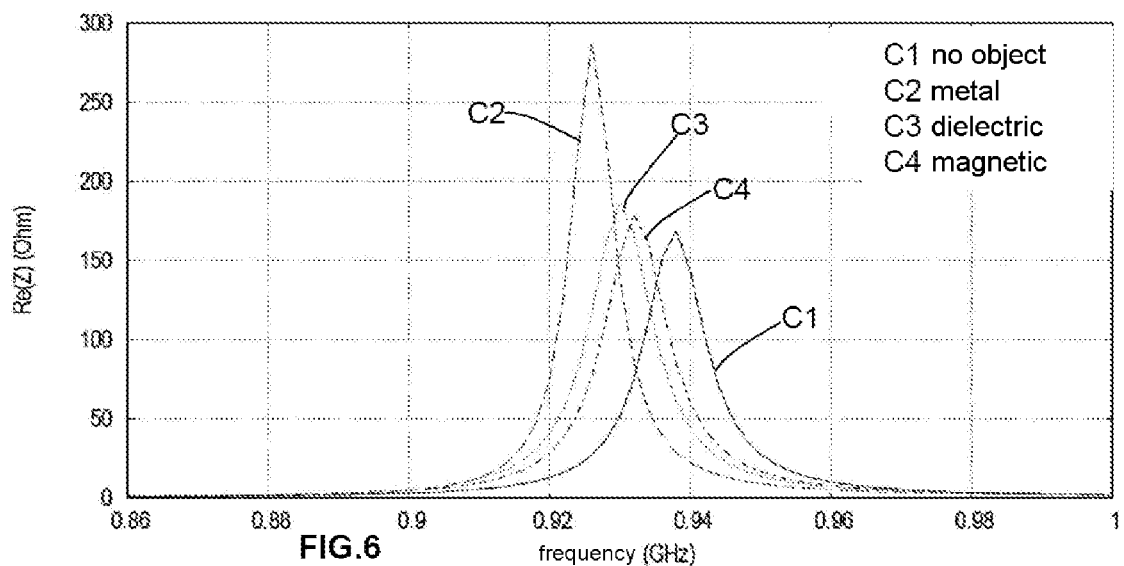

FIG. 6 illustrates the influence of the nature of the material of the object located at d=1 mm on the real part of the impedance (dimensions Lp=160 mm, Ep=5 mm, Tr=160 mm) as a function of frequency. In fact, in the broad sense, the impedance of the antenna is observed over a range of frequencies, a resonant phenomenon is observable. FIG. 6 notably represents various types of disturbing materials located at d=1 mm from the end of the antenna 2. The curve C1 illustrates the real part of the impedance as a function of frequency when no object 5 is present in the near field of the antenna, the curve C2 illustrates the real part of the impedance as a function of frequency when the material of the object 5 is metal, the curve C3 illustrates the real part of the impedance as a function of frequency when the material of the object is a dielectric, the curve C4 illustrates the real part of the impedance as a function of frequency when the material of the object 5 is magnetic. It is then found that the disturbances are different (shift in frequency, amplitude change, quality factor of the resonance) depending on the type of material. Discriminating the nature of the material is therefore possible at given position and dimensions of the disturbing material forming the object 5.

Figure 7:
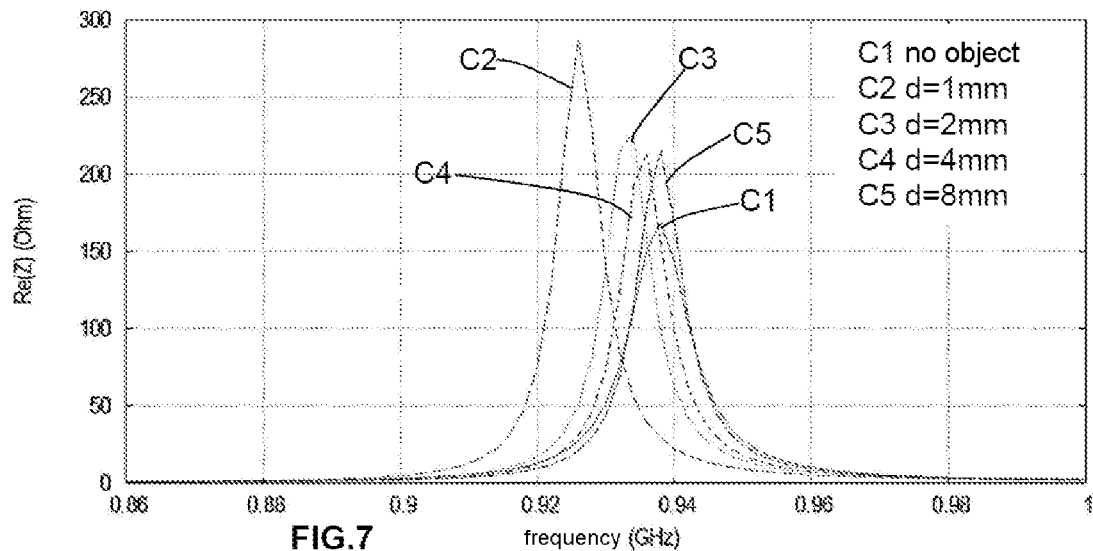

FIG. 7 displays the influence of the distance separating the antenna 2 (of the type in FIG. 5) from the object 5 on the real part of the impedance when the body 5 is a metal plate of dimensions Lp=160 mm, Ep=5 mm, Tr=160 mm. In this FIG. 7, the curve C1 represents the real part of the impedance of the antenna 2 as a function of frequency when the object 5 is not present, the curve C2 represents the real part of the impedance of the antenna 2 as a function of frequency when the distance d is 1 mm, the curve C3 represents the real part of the impedance of the antenna 2 as a function of frequency when the distance d is 2 mm, the curve C4 represents the real part of the impedance of the antenna 2 as a function of frequency when the distance d is 4 mm, and the curve C5 represents the real part of the impedance of the antenna 2 as a function of frequency when the distance d is 8 mm. Here, a shift in frequency is noted that is more pronounced the closer the metal plate 5 is to the antenna 2. A progressive increase is also observed in the amplitude (quality factor) of the resonance with the reduction in the spacing d. Information on the distance of the metal plate may therefore be extracted from observing the evolution of the impedance after a calibration phase, for example.

Figure 8:
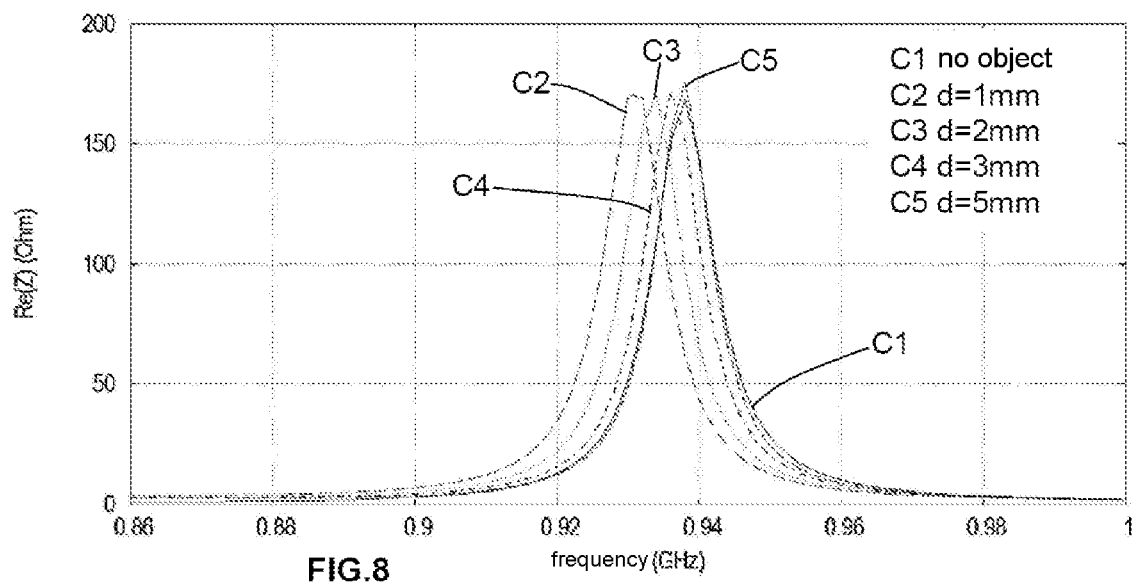

FIG. 8 displays the influence of the distance d on the real part of the impedance in the case of a dielectric plate as the object 5 with as electrical permittivity $\varepsilon_r=10$ of dimensions Lp=160 mm, Ep=5 mm, Tr=160 mm. In this FIG. 8, the curve C1 represents the real part of the impedance of the antenna 2 as a function of frequency when the object 5 is not present, the curve C2 represents the real part of the impedance of the antenna 2 as a function of frequency when the distance d is 1 mm, the curve C3 represents the real part of the impedance of the antenna 2 as a function of frequency when the distance d is 2 mm, the curve C4 represents the real part of the impedance of the antenna 2 as a function of frequency when the distance d is 3 mm, and the curve C5 represents the real part of the impedance of the antenna 2 as a function of frequency when the distance d is 5 mm. A shift in frequency is only noted that is more pronounced the closer the dielectric plate 5 is to the antenna 2. Information on the distance of the dielectric object 5 may be extracted from observing the evolution of the impedance after a calibration phase, for example. The stability of the amplitude of the resonance with the spacing of the dielectric material may be used to advantage for discriminating a metal object from a dielectric object.

Figure 9:
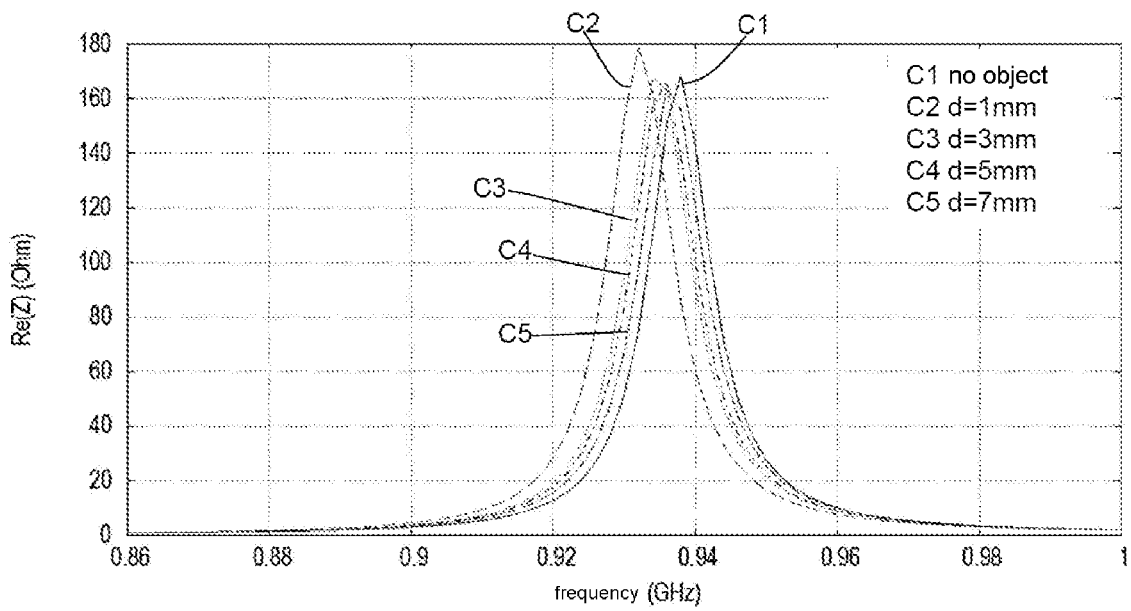

FIG. 9 displays the influence of the distance d on the real part of the impedance of the antenna 2 in FIG. 5 in the case of an object 5 formed of a magnetic plate of magnetic permeability $\mu_r=10$, and of dimensions Lp=160 mm, Ep=5 mm, Tr=160 mm. In this FIG. 9, the curve C1 represents the real part of the impedance of the antenna 2 as a function of frequency when the object 5 is not present, the curve C2 represents the real part of the impedance of the antenna 2 as a function of frequency when the distance d is 1 mm, the curve C3 represents the real part of the impedance of the antenna 2 as a function of frequency when the distance d is 3 mm, the curve C4 represents the real part of the impedance of the antenna 2 as a function of frequency when the distance d is 5 mm, and the curve C5 represents the real part of the impedance of the antenna 2 as a function of frequency when the distance d is 7 mm. A shift in frequency is only noted that is more pronounced the closer the magnetic plate 5 is to the antenna 2. Information on the distance of the magnetic plate 5 may be extracted from observing the evolution of the impedance after a calibration phase, for example. The stability of the amplitude of the resonance with the spacing of the magnetic material is a piece of information for differentiating a metal object. It may also be emphasized that the frequency variation is less with the magnetic material than with the dielectric material. This phenomenon is attributed to the electrical nature of the antenna 2. Indeed, an antenna 2 of the magnetic dipole type should exhibit a dual behavior vis-à-vis electrical and magnetic materials.

FIG. 10 displays the influence of the thickness Ep of a dielectric material Ep ($\varepsilon_r=10$, d=1 mm, Lp=160 mm, Ep variable with notably as the starting value 5 mm, Tr=160 mm) on the real part of the impedance. In this FIG. 10, the curve C1 represents the real part of the impedance of the antenna 2 as a function of frequency when the object 5 is not present, the curve C2 represents the real part of the impedance of the antenna 2 as a function of frequency when the thickness Ep is 5 mm, the curve C3 represents the real part of the impedance of the antenna 2 as a function of frequency when the thickness Ep is 10 mm, the curve C4 represents the real part of the impedance of the antenna 2 as a function of frequency when the thickness Ep is 20 mm, and the curve C5 represents the real part of the impedance of the antenna 2 as a function of frequency when the thickness Ep is 40 mm. A progressive shift in frequency is noted with the thickness of the object 5 the material of which is known. Information on the thickness of the object 5 may be extracted from observing the evolution of the resonance frequency after a calibration phase, for example. The variation in the amplitude of the resonance with the thickness of the object 5 made of dielectric material is not monotonous. This behavior is surely linked to resonance phenomena in the material. This limits the use of simple information with this criterion alone. The quality factor associated with the antenna 2 may advantageously be used, which seems to decrease with the size of the object 5, for completing the analysis of the disturbances.

FIG. 11 displays the influence of the thickness of an object 5 made of a magnetic material located at 1 mm from the antenna ($\mu_r$=10, d=1 mm, Lp=160 mm, Ep variable) on the real part of the impedance of the antenna 2 according to FIG. 5. In this FIG. 11, the curve C1 represents the real part of the impedance of the antenna 2 as a function of frequency when the object 5 is not present, the curve C2 represents the real part of the impedance of the antenna 2 as a function of frequency when the thickness Ep is 10 mm, the curve C3 represents the real part of the impedance of the antenna 2 as a function of frequency when the thickness Ep is 15 mm, the curve C4 represents the real part of the impedance of the antenna 2 as a function of frequency when the thickness Ep is 20 mm, and the curve C5 represents the real part of the impedance of the antenna 2 as a function of frequency when the thickness Ep is 25 mm. A progressive shift in frequency is noted with the thickness of the object 5 formed of magnetic material. Information on the thickness of the object 5 may be extracted from observing the evolution of the resonance frequency after a calibration phase, for example. It may also be emphasized that the frequency variation is less with the magnetic material than with the dielectric material. This phenomenon is attributed to the electrical nature of the antenna 2. An antenna of the magnetic dipole type should exhibit a dual behavior vis-à-vis electrical and magnetic materials. In fact, a duality is observed in the effects of magnetic materials on electrical antennas, and in the effects of electrical materials on magnetic antennas. The variation in the amplitude of the resonance with the thickness of the object 5 made of magnetic material is not monotonous. This behavior is surely linked to resonance phenomena in the material. This limits the use of simple information with this criterion alone. As for the dielectric material, the quality factor, which seems to decrease with the size of the object, may advantageously be used for completing the analysis of the disturbances.

The examples given above make it possible to obtain information regarding the object 5 from the real part of the impedance of the antenna 2. As previously mentioned, the imaginary part may also be used. In particular, FIG. 12 illustrates the imaginary part associated with FIG. 6. Clearly it is deduced from this that information is usable depending on the material of the object 5. The imaginary part is generally related to the real part concerning resonant phenomena (quality factor). The average level of the imaginary part may be further used for providing information on the disturbance of the near field.

It follows from what has been said of FIGS. 6 to 12 that the analysis of the impedance of the antenna 2, be it the real and/or imaginary part of the impedance of the antenna 2 advantageously makes it possible to detect and/or characterize an object 5 when it is present in the near field of the antenna 2 of the device described.

Thus, depending on the properties of the antenna 2 (and its behavior whether electrical or magnetic) and on the sensor function to be performed (therefore the type of the disturbing object 5 and what is intended to be discovered about this object 5), several strategies are possible. The simplest consists in calibrating the properties of the antenna 2 according to the envisaged disturbance scenario. To illustrate this simple case, it is possible to imagine that the device described is a proximity sensor in the sense that the object 5 will remain the same but its proximity will evolve in the near field of the antenna 2 (case of FIG. 7): The frequency most obviously gives the distance and in this case it is possible to be limited to this information and build a chart. To build this chart, there are several ways to proceed, either by electromagnetic simulation, or in the laboratory, or in situ. It is even possible to imagine a self-calibration with an advanced system where the scenario and data analysis are reproduced in which the extraction of calibration curves is performed automatically.

Moreover, depending on whether a vector or scalar impedance detector is used, the assessment criteria of disturbances may be adapted, made more complex, combined (quality factor, resonance frequency, monotonous or non-monotonous evolution of these parameters. etc.).

The influence of the quality factor of the antenna 2 has been previously mentioned. In fact, the quality factor Q of an antenna is defined as being the ratio between the maximum energy stored in the antenna and the total power radiated. The expression of the Q factor of an antenna is generally given in the following form:

$$Q = \frac{2\omega \cdot \max(W_e, W_m)}{P_{rad}} \quad (1)$$

With $W_e$ and $W_m$ respectively the average stored electrical and magnetic energies and $P_{rad}$ the power radiated by the antenna 2. This Q factor is generally inversely proportional to the bandwidth of the antenna 2 and the conventional design approach to antennas in contexts other than the present invention aims at obtaining relatively low quality factors for promoting the broadband behavior of said antennas. A low quality factor with regard to the previous formula may also mean that the radiation losses are high. The increase in the quality factor Q of the antenna 2 with its reduction in size is a known phenomenon. It indicates that the radiated power decreases in relation to the energy stored in the vicinity of the antenna 2. More particularly, the quality factor in the vicinity of a resonance may be assessed from the complex impedance with the aid of the following formula:

$$Q = \frac{\omega_0}{2R_0(\omega_0)}|Z_0'(\omega_0)| \quad (2)$$

With $R_0$ the real part of the input impedance of the antenna, $Z_0'$ the derivative of the input impedance and $\omega_0$ the resonance pulsation of the antenna. The quality factor (Q) is proportional to the derivative of the impedance and constitutes a criterion that makes it possible to assess the speed of the variations in the complex impedance of the antenna. For the present invention, the use of an antenna 2 with a high quality factor is particularly useful for intensifying the sensitivity of the antenna 2 in the near field area. It makes it possible to effectively detect and characterize the changes in the impedance of the antenna 2 notably thanks to the narrow-band properties. The increase in the quality factor of the antenna 2 is therefore a sensitivity performance optimizing parameter of the antenna 2 used as a sensor in its context. Accordingly, it is clear that the antenna 2 chosen as part of the method and the device preferably has a high quality factor Q. Preferably, the no-load quality factor of the antenna is greater than 10, and notably may go up to several hundred. "No-load quality factor" is understood to mean the quality factor when no object is present in the near field of the antenna 2.

It follows from all that has been said above that the invention is also related to a method of processing of an object 5 from an electrically small antenna 2, i.e. of data processing of the object 5 placed in the near field of the antenna 2. Such a method (FIG. 13) may comprise the following steps: placing E1 said object 5 in the near field of the antenna 2 (FIG. 1) notably whereby it results in the disturbance of at least one parameter of the antenna 2, measuring E2 said at least one parameter of the antenna 2, and using E3 said at least one measured parameter for obtaining at least one piece of information relating to said object 5 placed in the near field of the antenna 2.

It is clear that the method of processing may comprise a step of using the device as previously described. In this case, the step of measuring may be implemented by the measuring element 4 of the processing module and the step of using may be implemented by the processing module 3.

According to one embodiment, the step of using E3 comprises a step of comparing said at least one measured parameter, or a value determined from said at least one measured parameter, with processing data. The processing data may be charts such as those previously described and usable by the processing module 3 so that it may successfully conduct its analysis for obtaining said at least one piece of information relating to said object 5 placed in the near field of the antenna 2.

The step of measuring E2 of said at least one parameter may comprise a measurement of a representative value of the impedance of the antenna 2 with the result that it is possible to determine a real and/or imaginary part of the impedance of the antenna 2. This step may be implemented by actuating the measuring element 4 described above. Accordingly, the step of using E3 may comprise a step of determining the real and/or imaginary part of the input impedance of the antenna 2 from said at least one measured parameter. In fact, it is possible to determine the impedance when the measuring element 4 allows a vector measurement making it possible to obtain the modulus and the phase of the reflection coefficient making the value of the impedance accessible (imaginary and real part since there cannot be one without the other).

It will be noted that when the measuring element 4 used is a scalar detector, it is possible to obtain only the modulus of the reflection coefficient, which does not allow an impedance value to be fed back but may make it possible to determine a frequency, a quality coefficient. This information may optionally be used to characterize the object 5.

For example, the method may comprise a step of extracting an impedance peak obtained at the resonance of the antenna and/or the quality factor associated with said real and/or imaginary part of the impedance. In particular, the extracted impedance peak and/or the extracted quality factor is compared with processing data (e.g. the charts previously mentioned) for determining said at least one piece of information relating to said object placed in the near field of the antenna 2.

It results from what has been said previously that said at least one piece of information relating to said object 5 is chosen from among at least one of the following pieces of information: a nature of the object 5, a size/dimension of the object 5, a position of the object 5 in relation to the antenna 2. Depending on the information sought, the processing module 3 and/or the method may use the teachings from FIGS. 6 to 12.

According to one implementation of the method, the latter comprises a step of detecting said object 5 in the near field of the antenna 2. Said steps of measuring E2 at least one parameter of the antenna 2 and using E3 said at least one measured parameter being implemented only when the object 5 is detected in the near field of the antenna 2. For example, this detecting may be implemented by monitoring the evolution of the impedance of the antenna 2 so that when a variation in impedance becomes larger than a predetermined threshold then the steps of measuring and using are implemented.

It is clear that the processing of the object 5 depends on the volume occupied by the near field of the antenna 2. The dimensions of this volume may be adapted according to the applications. Of course, this will be done at the time of designing the device so that it is adapted for a predetermined volume. This adaptation of the volume delimiting the near field of the antenna 2 could, for example, be implemented during the design of the antenna by modifying the operating frequency of the antenna 2. Indeed, it was seen previously that the near field of the antenna 2 was a function of the operating wavelength of the antenna 2 which is itself a function of the operating frequency of the antenna 2 by applying the following equation: $\lambda = c/f$ with $\lambda$ the operating wavelength of the antenna 2, c the speed of light, and f the operating frequency of the antenna 2. The person skilled in the art is therefore able to modify these parameters in order to adapt them.

Of course, it follows from what has been said previously, that said at least one piece of information relating to said object 5 placed in the near field of the antenna 2 is compatible with using the device or the method described. Accordingly, if the method and/or the device are used for forming a proximity sensor of a metal object then the results from FIG. 7 will be used, if the method and/or the device are used for forming a sensor for determining the thickness of a magnetic object then the results from FIG. 9 will be used, etc.

In other words, the method of processing may be such that it has at least one of the following configurations:
the size of the object and the material being known, the step of using E3 makes it possible to determine the distance of the object in relation to the antenna 2,
the separation distance between the object and the antenna and the nature of the object (material) being known, the step of using E3 makes it possible to determine the size of the object,
the step of using E3 makes it possible to discriminate the material forming the object according to the distance separating the object from the antenna.

In some tests, it was possible to conjecture that a strong reduction in the efficiency of the antenna 2 was linked to an excessive reduction in the size of the antenna 2, which had the effect of limiting the observation of disturbances induced by the presence of the object 5 in the near field of the antenna 2. Accordingly, the efficiency of the electrically small antenna 2 is preferably greater than 0.1%, notably greater than 1% so that the observation of the disturbances linked to the presence of the object 5 in the near field of the antenna 2 is satisfactory. The efficiency of an antenna is well known to the person skilled in the art, being the ratio between the power delivered to the antenna and the total radiated power. In this document, the center of the antenna is defined as the center of gravity of the electrically conductive material or as the barycenter of the materials constituting the antenna, i.e. the electrically conductive material of the antenna and the possible dielectric substrate on which the electrically conductive material of the antenna is deposited.

For simplicity, this document uses the name of physical quantities to designate their values. Thus, it is said, for example, that a parameter is measured/determined/compared/calculated/used to mean that a value of this parameter is measured/determined/compared/calculated/used.

The invention claimed is:

1. A device comprising:
   an electrically small antenna,
   a processing module comprising a measuring element connected to the antenna for performing measurements of at least one parameter of the antenna, and
   a transmitting/receiving module connected to the antenna so as to allow transmitting and/or receiving data,
   wherein the processing module is configured for using the at least one measured parameter to obtain at least one piece of information relating to an object placed in a near field of the antenna,
   wherein, in at least one operating mode of the device, at least some of the measurements performed by the measuring element do not inhibit the reception and/or the transmission of the data.

2. The device as claimed in claim 1, which comprises a boundary between a near field of the antenna and a far field of the antenna, the boundary being delimited by a surface of a bounding sphere having a radius substantially equal to $\lambda/(2\pi)$ when the antenna is located at a center of the bounding sphere, where $\lambda$ corresponds to an operating wavelength of the antenna.

3. The device as claimed in claim 2, wherein the antenna is wholly included in a sizing sphere having a radius of less than $\lambda/10$ when the antenna is located at a center of the sizing sphere, where $\lambda$ corresponds to an operating wavelength of the antenna.

4. The device as claimed in claim 1, wherein the antenna is wholly included in a sizing sphere having a radius of less than $\lambda/10$ when the antenna is located at a center of the sizing sphere, where $\lambda$ corresponds to an operating wavelength of the antenna.

5. The device as claimed in claim 1, wherein the measuring element is a measuring element of a parameter representative of the impedance of the antenna.

6. The device as claimed in claim 1, wherein the antenna has a no-load quality factor greater than 10.

7. The device as claimed in claim 1, wherein the measuring element is a scalar or vector detector connected to the antenna.

8. A method of operating a device as claimed in claim 1, which comprises implementing an operating mode in which at least some of the measurements performed by the measuring element do not inhibit the reception and/or the transmission of said data.

9. A method of determining at least one piece of information relating to an object with the aid of an electrically small antenna, the method comprising:
   placing the object in a near field of the antenna,
   measuring at least one parameter of the antenna,
   using the at least one measured parameter so as to obtain the at least one piece of information relating to the object placed in the near field of the antenna,
   wherein the at least one measured parameter is measured without inhibiting the reception and/or the transmission of data to and from the antenna.

10. The method as claimed in claim 9, wherein the using of the at least one measured parameter comprises comparing the at least one measured parameter, or a value determined from the at least one measured parameter, with processing data.

11. The method as claimed in claim 9, wherein the measuring of the at least one parameter comprises a measurement of a value representative of the impedance of the antenna.

12. The method as claimed in claim 11, wherein the using of the at least one measured parameter comprises determining a real part and/or an imaginary part of an impedance of the antenna from the at least one measured parameter.

13. The method as claimed in claim 9, which comprises extracting a datum relating to an impedance peak of the antenna and/or extracting a quality factor associated with a real and/or imaginary part of an impedance of the antenna.

14. The method as claimed in claim 13, wherein the datum relating to the extracted impedance peak and/or the extracted quality factor is compared with processing data so as to determine the at least one piece of information relating to the object placed in the near field of the antenna.

15. The method as claimed in claim 9, wherein the at least one piece of information relating to the object is chosen from among at least one of the following pieces of information: the nature of the object, a dimension of the object, a position of the object in relation to the antenna.

16. The method as claimed in claim 9, which comprises detecting the object in the near field of the antenna, the measuring of the at least one parameter of the antenna, and the using of the at least one measured parameter being implemented only when the object is detected in the near field.

17. A device comprising:
    an electrically small antenna,
    a processing module comprising a measuring element connected to the antenna for measuring at least one parameter of the antenna,
    wherein the processing module is configured for using the at least one measured parameter for obtaining at least one piece of information relating to an object placed in a near field of the antenna,
    wherein the device comprises a boundary between a near field of the antenna and a far field of the antenna, the boundary being delimited by a surface of a bounding sphere having a radius substantially equal to $\lambda/(2\pi)$ when the antenna is located at a center of the bounding sphere, where $\lambda$ corresponds to an operating wavelength of the antenna.

18. A device comprising:
    an electrically small antenna,
    a processing module comprising a measuring element connected to the antenna for measuring at least one parameter of the antenna,
    wherein the processing module is configured for using the at least one measured parameter for obtaining at least one piece of information relating to an object placed in a near field of the antenna,
    wherein the antenna is wholly included in a sizing sphere having a radius of less than $\lambda/10$ when the antenna is located at a center of the sizing sphere, where $\lambda$ corresponds to an operating wavelength of the antenna.

19. A method of determining at least one piece of information relating to an object with the aid of an electrically small antenna, the method comprising:
    placing the object in a near field of the antenna,
    measuring at least one parameter of the antenna, using the at least one measured parameter so as to obtain the at least one piece of information relating to the object placed in the near field of the antenna, wherein the measuring of the at comprises a measurement of a value representative of the impedance of the antenna least one parameter, and wherein the using of the at least one measured parameter comprises determining a real part and/or an imaginary part of an impedance of the antenna from the at least one measured parameter.

20. The method as claimed in claim 19, which comprises extracting a datum relating to an impedance peak of the antenna and/or extracting a quality factor associated with a real and/or imaginary part of an impedance of the antenna.

* * * * *

UNITED STATES PATENT AND TRADEMARK OFFICE
CERTIFICATE OF CORRECTION

Page 1 of 1

PATENT NO. : 10,635,866 B2
APPLICATION NO. : 16/068202
DATED : April 28, 2020
INVENTOR(S) : Christophe Delaveaud It is certified that error appears in the above-identified patent and that said Letters Patent is hereby corrected as shown below:

In Claim 2, Column 13, Line 29:
Change:
"$\lambda(2\pi)$"
To:
-- $\lambda/(2\pi)$ --

Signed and Sealed this
Sixteenth Day of February, 2021

Drew Hirshfeld
*Performing the Functions and Duties of the*
*Under Secretary of Commerce for Intellectual Property and*
*Director of the United States Patent and Trademark Office*